(12) United States Patent
Lee et al.

(10) Patent No.: US 9,979,778 B2
(45) Date of Patent: May 22, 2018

(54) CLOUD DATA MANAGEMENT METHOD, ELECTRONIC APPARATUS AND CLOUD SERVER

(71) Applicant: Wistron Corporation, New Taipei (TW)

(72) Inventors: Ping-Chang Lee, New Taipei (TW); Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 184 days.

(21) Appl. No.: 14/733,965

(22) Filed: Jun. 9, 2015

(65) Prior Publication Data

US 2016/0226954 A1 Aug. 4, 2016

(30) Foreign Application Priority Data

Feb. 3, 2015 (TW) .............................. 104103546 A (51) Int. Cl.
*H04L 12/16* (2006.01)
*H04L 29/08* (2006.01)
*G06F 3/14* (2006.01)
*G06F 9/445* (2018.01)
*G06F 9/54* (2006.01)

(52) U.S. Cl.
CPC ............ *H04L 67/10* (2013.01); *G06F 3/1415* (2013.01); *G06F 9/445* (2013.01); *G06F 9/54* (2013.01); *H04L 67/125* (2013.01); *G09G 2358/00* (2013.01); *G09G 2370/022* (2013.01)

(58) Field of Classification Search
CPC ............................... H04L 67/10; H04L 67/125
See application file for complete search history.

(56) References Cited

U.S. PATENT DOCUMENTS

| 9,210,148 | B2 | 12/2015 | Bulusu et al. | |
|---|---|---|---|---|
| 9,686,281 | B2 | 6/2017 | Bulusu et al. | |
| 2003/0167333 | A1* | 9/2003 | Kumar | G06F 9/465 |
| | | | | 709/227 |
| 2007/0118609 | A1* | 5/2007 | Mullan | H04L 63/083 |
| | | | | 709/217 |

(Continued)

FOREIGN PATENT DOCUMENTS

| TW | M422693 | 2/2012 |
|---|---|---|
| TW | 201346634 | 11/2013 |

OTHER PUBLICATIONS

"Office Action of Taiwan Counterpart Application," dated Nov. 23, 2015, with English translation thereof, p. 1-p. 20, in which the listed references were cited.

(Continued)

*Primary Examiner* — Scott B Christensen
(74) *Attorney, Agent, or Firm* — JCIPRNET (57) ABSTRACT

A cloud data management method, an electronic apparatus and a cloud server are proposed. The method includes: executing an application launcher installed on the electronic apparatus to send a connection establishing request to the cloud server installed with an application; receiving a finishing command from the cloud server through a connection; and loading the application into a sandbox in the electronic apparatus through the application launcher in response to the finishing command, wherein the application is not installed on the electronic apparatus.

19 Claims, 5 Drawing Sheets

(56) References Cited

U.S. PATENT DOCUMENTS

| | | | |
|---|---|---|---|
| 2012/0017213 A1* | 1/2012 | Hunt | G06F 21/53 |
| | | | 718/100 |
| 2012/0265644 A1* | 10/2012 | Roa | G06Q 30/0643 |
| | | | 705/26.61 |
| 2013/0091557 A1* | 4/2013 | Gurrapu | H04W 4/003 |
| | | | 726/5 |
| 2013/0145463 A1 | 6/2013 | Ghosh et al. | |
| 2013/0318577 A1* | 11/2013 | Bulusu | G06F 21/00 |
| | | | 726/5 |
| 2014/0047081 A1 | 2/2014 | Edwards | |
| 2016/0057240 A1* | 2/2016 | Straub | G06F 3/0484 |
| | | | 709/227 |
| 2016/0065573 A1 | 3/2016 | Bulusu et al. | |

OTHER PUBLICATIONS

"Office Action of Taiwan Counterpart Application," dated Oct. 19, 2017, p. 1-p. 17, in which the listed references were cited.

* cited by examiner

CLOUD DATA MANAGEMENT METHOD, ELECTRONIC APPARATUS AND CLOUD SERVER

CROSS-REFERENCE TO RELATED APPLICATION

This application claims the priority benefit of Taiwan application serial no. 104103546, filed on Feb. 3, 2015. The entirety of the above-mentioned patent application is hereby incorporated by reference herein and made a part of this specification.

BACKGROUND OF THE INVENTION

Field of the Invention

The invention relates to a data management method, an electronic apparatus and a server, and more particularly, to a cloud data management method, an electronic apparatus and a cloud server.

Description of Related Art

With a trend of bring your own device (BYOD), there are more and more employees who use their own electronic apparatuses (e.g., cell phones, tablet computers, notebook computers, etc.) to handle business affairs and private affairs. In response to the trend of BYOD, a user is generally required to install business applications dedicated to manage business data on his/her own electronic apparatus, and these business applications and business data are often mixed with personal applications (e.g., games or social applications) and data of the user. Under this circumstance, the user may have to worry about personal data being collected by the business applications implementing the company policy. On the other hand, the company may also concern about the confidential business data being leaked when the user loses the electronic apparatus, or being stolen by malicious software in the electronic apparatus.

SUMMARY OF THE INVENTION

Accordingly, the invention is directed to a cloud data management method, an electronic apparatus and a cloud server, which are capable of preventing a business application and data thereof from being mixed with a private application and data owned by the user, such that a user experience may be improved and a risk of leaking confidential business data may also be reduced.

The invention provides a cloud data management method, which is adapted to an electronic apparatus and includes: executing an application launcher installed on the electronic apparatus to send a connection establishing request to a cloud server installed with an application, wherein the connection establishing request is configured to establish a connection with the cloud server; receiving a finishing command from the cloud server through the connection, wherein the finishing command indicates that at least one management policy is implemented for the application by the cloud server; and loading the application into a sandbox in the electronic apparatus through the application launcher in response to the finishing command, wherein the application is not installed on the electronic apparatus.

In an embodiment of the invention, the application is a responsive application, which adaptively adjusts a graphical user interface layout presented by the electronic apparatus in response to a screen size, a resolution and an operating system of the electronic apparatus.

In an embodiment of the invention, when the finishing command from the cloud server is received by the electronic apparatus through the connection, the method further includes: loading at least one running state data related to the application into the sandbox in the electronic apparatus through the application launcher.

In an embodiment of the invention, the at least one running state data includes at least one of a data file, a registry, cache data, a configuration file and a profile.

In an embodiment of the invention, when the application is running in the sandbox, a state snapshot of at least one current running state data related to the application is captured, and the state snapshot is redirected to the cloud server.

In an embodiment of the invention, when the application is initially running in the sandbox, the state snapshot is a full copy of the at least one current running state data. And, when the application is not initially running in the sandbox, the state snapshot records a state difference between the at least one current running state data and a previous state snapshot.

In an embodiment of the invention, when the electronic apparatus loads the application into the sandbox through the application launcher again, the state snapshot is obtained from the cloud server.

In an embodiment of the invention, when the application is suspended, a last state snapshot is captured and sent to the cloud server, and all data related to the application are removed from the electronic apparatus.

The invention provides an electronic apparatus, which includes a communication unit, a storage unit, a random access memory and a processing unit. The storage unit is configured to store a plurality of modules. The processing unit is coupled to the communication unit, the storage unit and the random access memory, and configured to access the modules in order to execute a cloud data management method. The method includes: executing an application launcher installed on the electronic apparatus to send a connection establishing request to a cloud server installed with an application through the communication unit, wherein the connection establishing request is configured to establish a connection with the cloud server; receiving a finishing command from the cloud server through the connection, wherein the finishing command indicates that at least one management policy is implemented for the application by the cloud server; and loading the application into a sandbox in the random access memory through the application launcher in response to the finishing command, wherein the application is not installed on the electronic apparatus.

In an embodiment of the invention, when the finishing command from the cloud server is received by the electronic apparatus through the connection, the processing unit of the electronic apparatus further loads at least one running state data related to the application into the sandbox in the random access memory through the application launcher.

In an embodiment of the invention, when the application is running in the sandbox, the processing unit of the electronic apparatus further captures a state snapshot of at least one current running state data related to the application, and redirects the state snapshot to the cloud server through the communication unit.

In an embodiment of the invention, when the electronic apparatus loads the application into the sandbox through the application launcher again, the processing unit of the electronic apparatus further obtains the state snapshot from the cloud server through the communication unit.

In an embodiment of the invention, when the application is suspended, the processing unit of the electronic apparatus further captures and sends a last state snapshot to the cloud server, and removes all data related to the application from the random access memory.

The invention provides a cloud data management method, which is adapted to a cloud server installed with an application and includes: receiving a connection establishing request sent by an application launcher installed on an electronic apparatus, and establishing a connection with the electronic apparatus according to the connection establishing request; and implementing at least one management policy for the application, and sending a finishing command to the electronic apparatus after implementing the at least one management policy, wherein the finishing command is configured to allow the electronic apparatus to load the application into a sandbox in the electronic apparatus through the application launcher, and the application is not installed on the electronic apparatus.

In an embodiment of the invention, the finishing command is further configured to allow the electronic apparatus to load at least one running state data related to the application into the sandbox in the electronic apparatus through the application launcher.

In an embodiment of the invention, the at least one management policy includes a virus scan operation, a data integrity check operation and an audit operation.

In an embodiment of the invention, when the electronic apparatus requests to open a file or a registry related to the application, the at least one management policy is implemented for the file or the registry and then the file or the registry is opened. In an embodiment of the invention, when the electronic apparatus requests to close the file or the registry related to the application, the file or the registry is closed and then the at least one management policy is implemented for the file or the registry.

In an embodiment of the invention, when the application is running in the sandbox, a state snapshot of at least one current running state data related to the application is received from the electronic apparatus.

In an embodiment of the invention, when the electronic apparatus loads the application into the sandbox through the application launcher again, the at least one management policy is implemented for the state snapshot and then the state snapshot is sent to the electronic apparatus.

The invention provides a cloud server, which includes a communication unit, a storage unit and a processing unit. The storage unit is configured to store a plurality of modules. The processing unit is coupled to the communication unit and the storage unit, and configured to access the modules to execute a cloud data management method. The method includes: receiving a connection establishing request sent by an application launcher installed on an electronic apparatus through the communication unit, and establishing a connection with the electronic apparatus according to the connection establishing request; and implementing at least one management policy for the application, and sending a finishing command to the electronic apparatus through the communication unit after implementing the at least one management policy, wherein the finishing command is configured to allow the electronic apparatus to load the application into a sandbox in the electronic apparatus through the application launcher, and the application is not installed on the electronic apparatus.

In an embodiment of the invention, when the electronic apparatus requests to open a file or a registry related to the application, the processing unit of the cloud server further implements the at least one management policy for the file or the registry and then opens the file or the registry. In an embodiment of the invention, when the electronic apparatus requests to close the file or the registry related to the application, the processing unit of the cloud server further closes the file or the registry and then implements the at least one management policy for the file or the registry.

In an embodiment of the invention, when the application is running in the sandbox, the processing unit of the cloud server further closes the file or the registry and then implements the at least one management policy for the file or the registry.

In an embodiment of the invention, when the electronic apparatus loads the application into the sandbox through the application launcher again, the processing unit of the cloud server further implements the at least one management policy for the state snapshot and then sends the state snapshot to the electronic apparatus.

Based on the above, the cloud data management method proposed by the embodiments of the invention is capable of allowing the electronic apparatus to load the application installed on the cloud server into the sandbox in the electronic apparatus through the application launcher in order to prevent the application (e.g., the business applications implementing the company policy) and data thereof from being mixed with the private application and the data thereof, such that the user experience may be improved and the risk of leaking the confidential business data may also be reduced.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
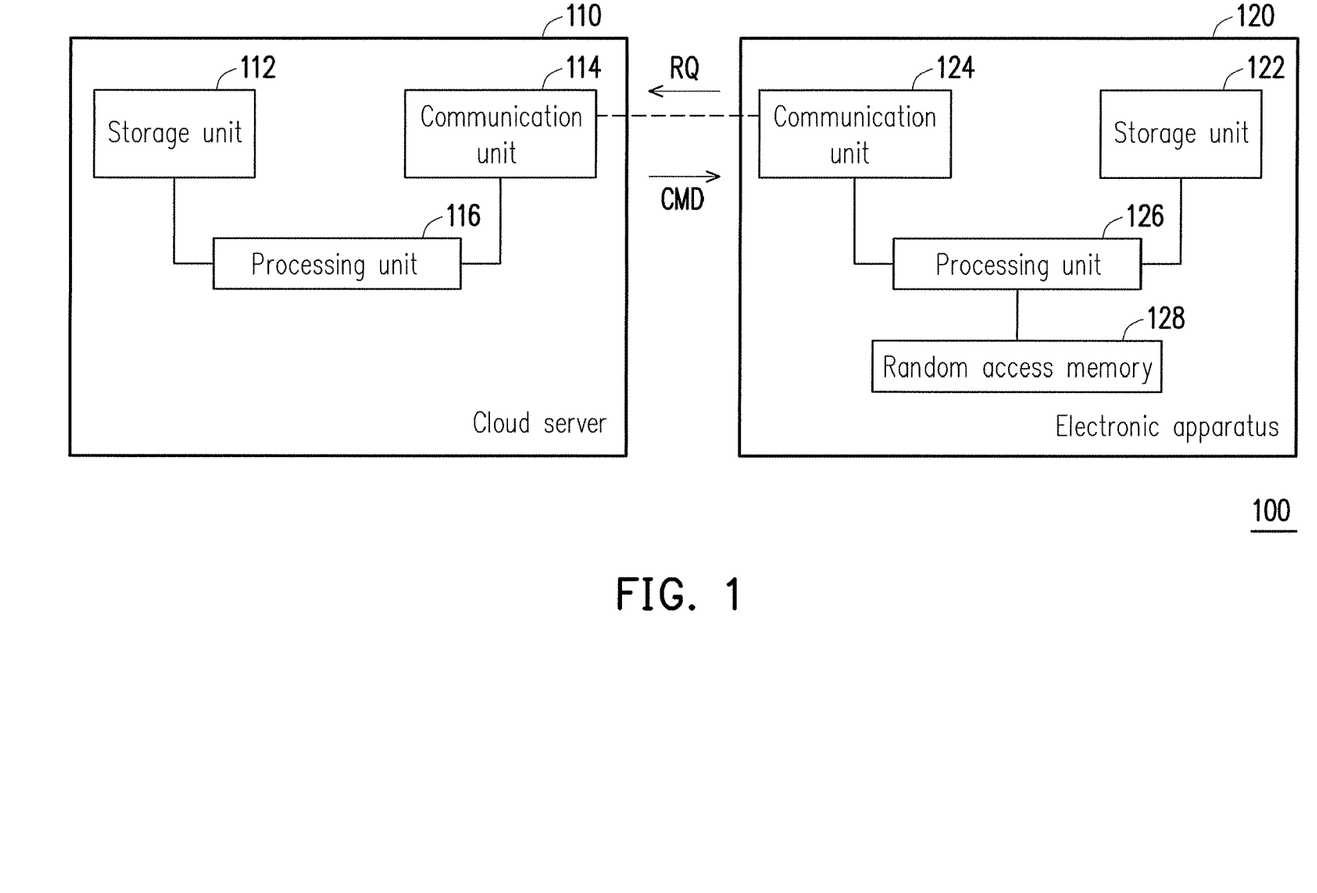
FIG. 1 is a schematic diagram illustrating a cloud server system according to an embodiment of the invention.

FIG. 1 is a schematic diagram illustrating a cloud server system according to an embodiment of the invention. In the present embodiment, a cloud server system 100 includes a cloud server 110 and an electronic apparatus 120. The cloud server 110 is, for example, a data center or other similar server apparatuses and server systems installed on a cloud network. The cloud server 110 includes a storage unit 112, a communication unit 114 and a processing unit 116.

The electronic apparatus 120 is, for example, a cell phone, a smart phone, a personal computer (PC), a notebook PC, a netbook PC, a tablet PC, a television, a game console, a portable apparatus, or a portable multimedia player. The electronic apparatus 120 includes a storage unit 122, a communication unit 124, a processing unit 126 and a random access memory 128.

Each of the storing units 112 and 122 may be, for example, a memory, a hard disk or other devices capable of storing data for recording a plurality of program codes or modules. Each of the communication units 114 and 124 may be configured to process Radio Frequency (RF) signals of cellular communication technology such as Global System for Mobile (GSM) system, 3GPP LTE, Code Division Multiple Access (CDMA), WCDMA, High Speed Packet Access (HSPA), World Interoperability for Microwave Access (Wi-MAX) and so on. In addition, the communication units 114 and 124 may further process RF signals of Wireless Local Area Network (WLAN) communication technology.

Each of the communication units 114 and 124 may include a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA), one or more antenna units and a local storage media component (but the invention is not limited thereto), so as to provide communication functions for the cloud server 110 and the electronic apparatus 120 in FIG. 1.

The processing unit 116 of the cloud server 110 is coupled to the storage unit 112 and the communication unit 114. The processing unit 126 of the electronic apparatus 120 is coupled to the storage unit 122, the communication unit 124 and the random access memory 128. Each of the processing units 116 and 126 may be, for example, a processor for general purposes, a processor for special purposes, a conventional processor, a data signal processor, a plurality of microprocessors, one or more microprocessors, controllers, microcontrollers and Application Specific Integrated Circuit (ASIC) which are combined to a core of the digital signal processor, a Field Programmable Gate Array (FPGA), any other integrated circuits, a state machine, a processor based on Advanced RISC Machine (ARM) and similar products.

In the present embodiment, the processing unit 116 may access a plurality of modules stored in the storage unit 112, and the processing unit 126 may access a plurality of modules stored in the storage unit 122, so as to execute a cloud data management method proposed by the invention.

Figure 2:
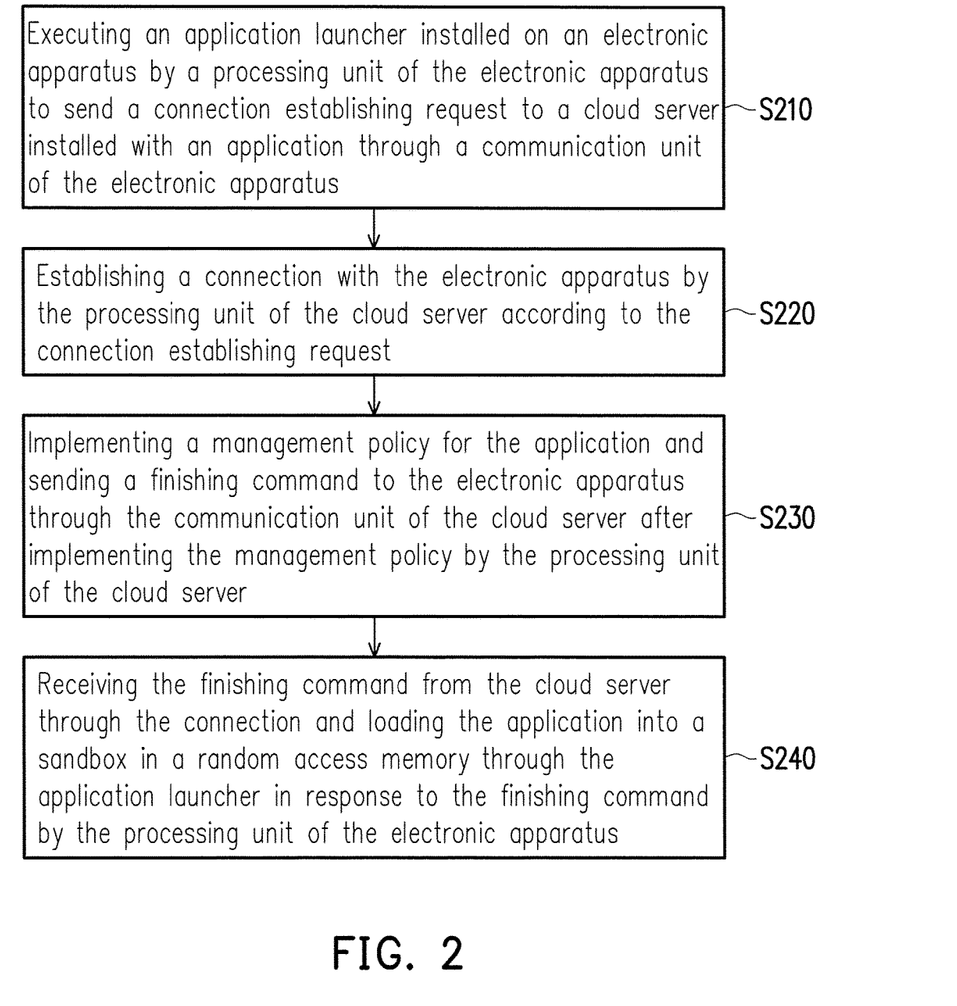
FIG. 2 is a flowchart illustrating the cloud data management method according to an embodiment of the invention.

FIG. 2 is a flowchart illustrating the cloud data management method according to an embodiment of the invention. In the present embodiment, the method proposed by the present embodiment can be executed by the cloud server 110 and the electronic apparatus 120 in FIG. 1, and each step of the present embodiment is described in detail with reference to each element depicted in FIG. 1.

In step S210, the processing unit 126 of the electronic apparatus 120 executes an application launcher installed on the electronic apparatus 120 to send a connection establishing request RQ to the cloud server 110 installed with an application through the communication unit 124 of the electronic apparatus 120. In step S220, the processing unit 116 of the cloud server 110 may establish a connection with the electronic apparatus 120 according to the connection establishing request RQ. The application is, for example, a business application dedicated to manage business data, but the implementation of the invention is not limited thereto.

In an embodiment, when the connection establishing request RQ is received, the cloud server 110 may execute an identity authentication procedure for the electronic apparatus 120 to confirm whether the electronic apparatus 120 and the user thereof have the qualification for accessing information in the cloud server 110. The identity authentication procedure includes, for example, controlling the electronic apparatus 120 to display a login screen that is configured for the user of the electronic apparatus 120 to enter identity information such as an account name and a password. In other embodiments, if the application stored in the cloud server 110 is the business application dedicated to manage business data of one specific company, the account name of the user may be set as, for example, an employee number or an email account of the user in the specific company, but the implementation of the invention is not limited thereto.

After the electronic apparatus 120 passed the identity authentication procedure, the cloud server 110 may provide a private storage space dedicated to the user of the electronic apparatus 120 through the connection so that the electronic apparatus 120 may store/access data. Under this circumstance, the application may be, for example, installed on said private storage space. In other embodiments, after the electronic apparatus 120 passed the identity authentication procedure, the cloud server 110 may also provide a public storage space that can be shared by multiple employees of the specific company so that the employees may store/access data. Under this circumstance, the application may be, for example, installed on said public storage space so that each of the employees may gain access to the application and related data thereof.

In step S230, the processing unit 116 of the cloud server 110 implements a management policy for the application, and sends a finishing command CMD to the electronic apparatus 120 through the communication unit 114 of the cloud server 110 after implementing the management policy. The finishing command CMD is, for example, a command used to inform the electronic apparatus 120 that the management policy is already implemented for the application by the cloud server 110 and the electronic apparatus 120 is allowed to load the application into the electronic apparatus 120 from the cloud server 110, but the implementation of the invention is not limited thereto.

In an embodiment, the management policy includes a virus scan operation, a data integrity check operation and an audit operation. In other embodiments, when the cloud server 110 is additionally stored with running state data related to the application such as a data file, a registry, cache data, a configuration file and a profile, the processing unit 116 of the cloud server 110 may also implement the management policy for said running state data. Further, the cloud server 110 may send the finishing command to the electronic apparatus 120 after implementing the management policy for the application and the related running state data thereof.

From another perspective, because the cloud server 110 is capable of implementing the management policy for the application, it can be ensured that the data related to the application and accessed by electronic apparatus 120 is safe and integral.

In other embodiments, in the case where the cloud server 110 is capable of allowing multiple users to access the same application and related data thereof, a manager of the cloud server 110 is able to allow the users to access the same application and related data thereof simply by managing the data stored on the cloud server 110. As such, since the manager no longer needs to deploy the application and the related data individually onto the electronic apparatuses of the users, a convenience in management may be improved accordingly.

In step S240, the processing unit 126 of the electronic apparatus 120 is capable of receiving the finishing command CMD from the cloud server 110 through the connection and loading the application into a sandbox in the random access memory 126 through the application launcher in response to the finishing command CMD.

In an embodiment, when the electronic apparatus 120 receives the finishing command CMD from the cloud server 110 through the connection, the processing unit 126 of the electronic apparatus 120 may further load the running state data (in which the management policy is already implemented by the cloud server 110) related to the application into the sandbox in the electronic apparatus 120 through the application launcher.

In another embodiment, the sandbox is, for example, a simulated environment (e.g., a block that is divided from random access memory 128 and dedicated to the application) established in the electronic apparatus 120 by the processing unit 126. After being loaded into the sandbox, the application cannot access or influence other programs or hardware outside the sandbox. Meanwhile, the application cannot be accessed or influenced by the programs or hardware outside the sandbox either.

That is to say, for the user, the application (e.g., the business applications implementing the company policy) and the data will no longer be mixed with personal application and data owned by the user. Furthermore, the personal data of the user will no longer be collected by the business applications implementing the company policy.

In addition, because the application is installed on the cloud server 110 but not installed the electronic apparatus 120, the user only needs to install the application launcher with special design on the electronic apparatus 120 in order to load the application installed on the cloud server 110 through the application launcher. In other words, the user no longer needs to install various business applications related to work on the electronic apparatus 120. Accordingly, the method proposed by the present embodiment of the invention is also capable of improving a user experience at the same time.

On the other hand, the company will no longer need to concern about the confidential business data being leaked when the user loses the electronic apparatus 120, or being stolen by malicious software in the electronic apparatus 120.

In an embodiment, the application is, for example, a responsive application, which adaptively adjusts a graphical user interface layout (GUI layout) presented by the electronic apparatus 120 in response to a screen size, a resolution and an operating system of the electronic apparatus 120. For instance, the application running in the sandbox may request the sandbox for the screen size, the resolution and the operating system of the electronic apparatus 120, so that the sandbox may then request the electronic apparatus 120 for aforesaid information.

Also, the application may further adjust the GUI layout presented by the electronic apparatus 120 in response to a conventional interface configuration of the operating system used by the electronic apparatus 120. For instance, in the case where a "Confirm" button is disposed at the left side of a "Cancel" button by the operating system of the electronic apparatus 120, the application may accordingly adjust the "Confirm" button generated during operation to be disposed at the left side of the "Cancel" button. On the other hand, in the case where the "Confirm" button is disposed at the right side of the "Cancel" button by the operating system of the electronic apparatus 120, the application may also accordingly adjust the "Confirm" button generated during operation to be disposed at the right side of the "Cancel" button, but the implementation of the invention is not limited thereto.

In an embodiment, when the electronic apparatus 120 requests to open a file or a registry related to the application, the processing unit 116 of the cloud server 110 may further implement the management policy for the file or the registry and then open the file or the registry thereafter. On the other hand, when the electronic apparatus 120 requests to close the file or the registry related to the application, the processing unit 116 of the cloud server 110 may further close the file or the registry and then implement the management policy for the file or the registry thereafter.

In brief, when the electronic apparatus 120 requests to open/close the file (or the registry), mechanisms implemented by the processing unit 116 of the cloud server 110 are "implementing the management policy before opening the file" and "closing the file before implementing the management policy." Accordingly, not only the safety and data integrity of the file accessed by electronic apparatus 120 can be ensured, safety and data integrity of the file stored by the cloud server 110 after the electronic apparatus 120 completes use of the file may also be ensured.

Figure 3:
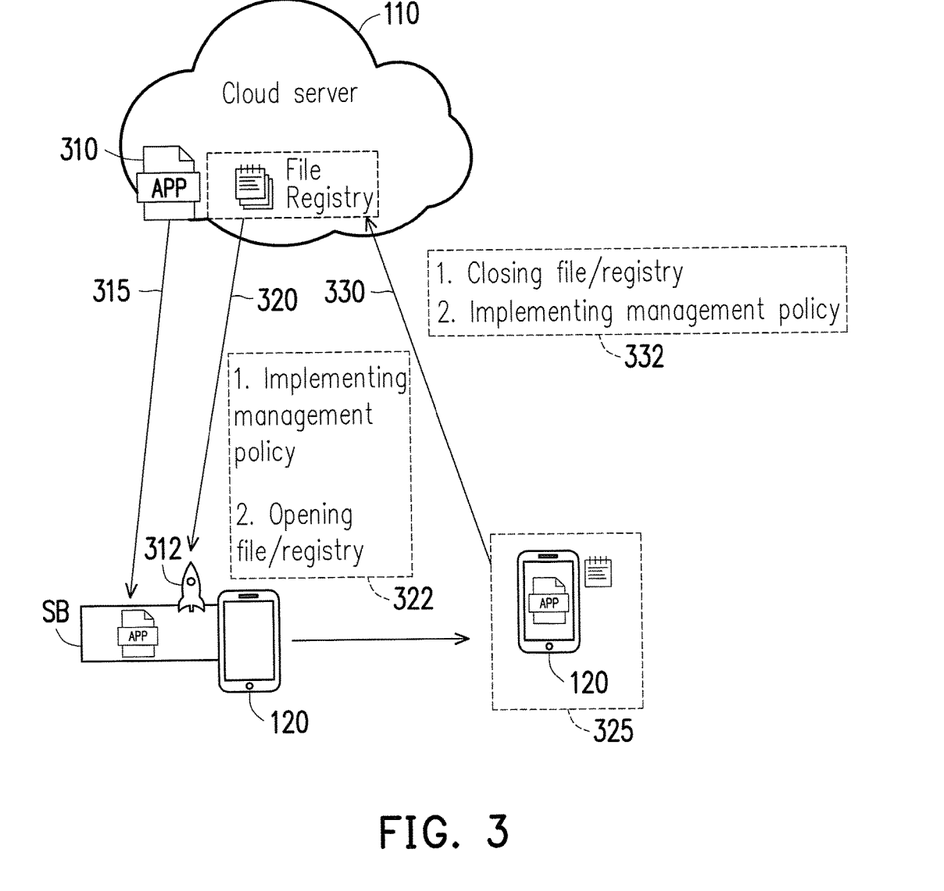
FIG. 3 is a schematic diagram illustrating an interaction between the cloud server and the electronic apparatus according to an embodiment of the invention.

Referring to FIG. 3, FIG. 3 is a schematic diagram illustrating an interaction between the cloud server and the electronic apparatus according to an embodiment of the invention. In the present embodiment, the electronic apparatus 120 may load an application 310 installed on the cloud server 110 into a sandbox SB of the electronic apparatus 120 through an application launcher 312 according to foregoing teachings (corresponding to an arrow 315). Subsequently, when the electronic apparatus 120 intends to open the file or the registry on the cloud server 110 (corresponding to an arrow 320), the processing unit 116 of the cloud server 110 may implement the mechanism of "implementing the management policy before opening the file" according to a procedure 322. Accordingly, the electronic apparatus 120 may then open the file (which is represented by a running state 325). Thereafter, when the electronic apparatus 120 intends to close the file or the registry on the cloud server 110 (corresponding to an arrow 330), the processing unit 116 of the cloud server 110 may implement the mechanism of "closing the file before implementing the management policy" according to a procedure 332.

Figure 4A:
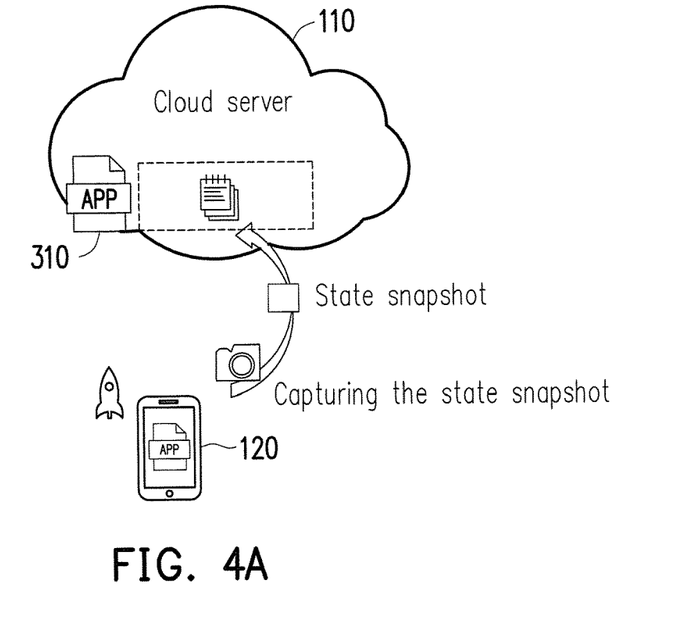
FIG. 4A illustrates a schematic diagram for capturing a state snapshot according to an embodiment of the invention.

Referring to FIG. 4A, FIG. 4A illustrates a schematic diagram for capturing a state snapshot according to an embodiment of the invention. In the present embodiment, when the application 310 is running in the sandbox, the processing unit 126 of the electronic apparatus 120 may further capture a state snapshot of current running state data related to the application 310, and redirect the state snapshot to the cloud server 110 through the communication unit 124 of the electronic apparatus 120. The current running state data includes, for example, the data file, the registry, the cache data, the configuration file and the profile generated while running the application 310, but the invention is not limited thereto.

In an embodiment, when the application 310 is initially running in the sandbox, the state snapshot is a full copy of the current running state data. In other embodiments, when the application 310 is not initially running in the sandbox, the state snapshot records a state difference between the current running state data and a previous state snapshot.

In brief, when the application 310 is not initially running in the sandbox, the processing unit 126 of the electronic apparatus 120 may simply captures the state difference only, so as to reduce a data quantity required by the redirection. However, when the application 310 is initially running in the sandbox, because the previous state snapshot does not exist, the processing unit 126 of the electronic apparatus 120 must redirect the full copy of the current running state data to the cloud server 110.

Figure 4B:
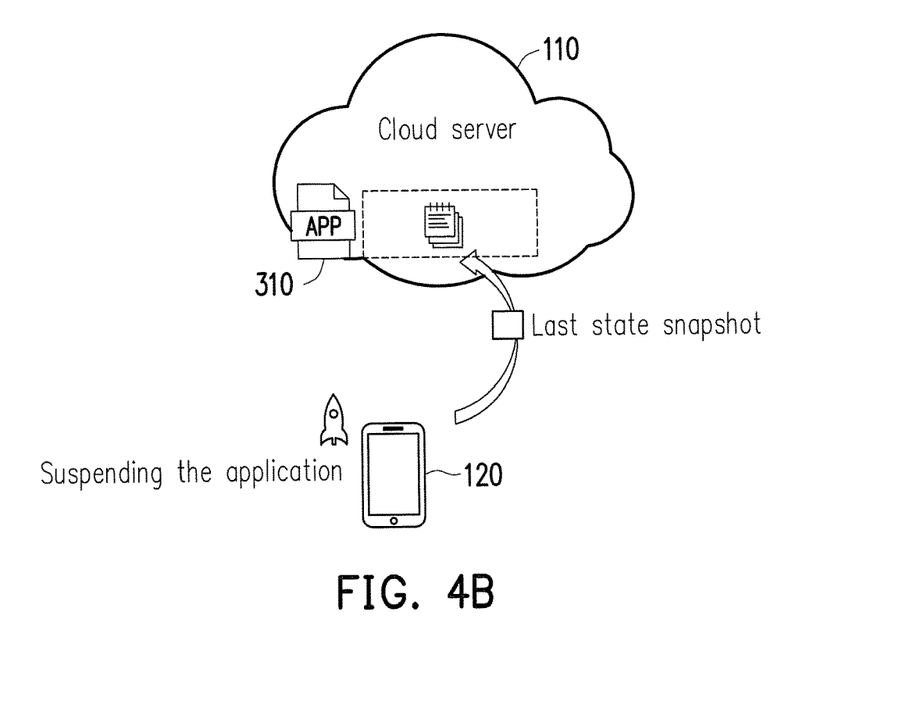
FIG. 4B illustrates a schematic diagram for capturing a last state snapshot according to an embodiment of the invention.

Referring to FIG. 4B, FIG. 4B illustrates a schematic diagram for capturing a last state snapshot according to an embodiment of the invention. In the present embodiment, when the application 310 is suspended, the processing unit 126 of the electronic apparatus 120 may capture and send a last state snapshot to the cloud server 110, and remove all data related to the application 310 from the random access memory 128 of the electronic apparatus 120.

Figure 5:
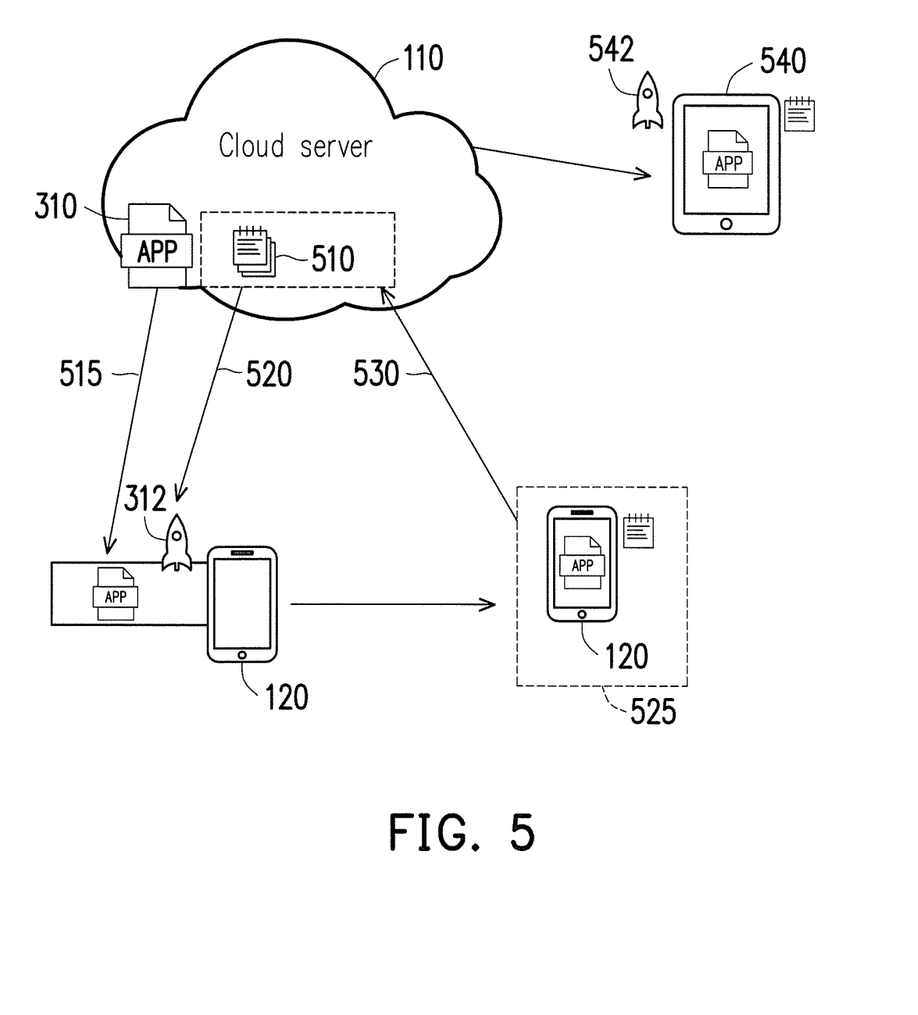
FIG. 5 illustrates a schematic diagram for resuming application and migrating application according to an embodiment of the invention.

Referring to FIG. 5, FIG. 5 illustrates a schematic diagram for resuming application and migrating application according to an embodiment of the invention. In the present embodiment, when the electronic apparatus 120 loads the application 310 into the sandbox through the application launcher again (corresponding to an arrow 515), the processing unit 116 of the cloud server 110 may further implement the management policy for a state snapshot 510 and then send the state snapshot 510 to the electronic apparatus 120 (corresponding to an arrow 520). The state snapshot 510 may be, for example, the last state snapshot as mentioned above, or may be the state snapshot previously redirected to the cloud server 110 at any time-point. As such, the processing unit 126 of the electronic apparatus 120 may then obtain the state snapshot 510 from the cloud server 110. When the state snapshot 510 is the last state snapshot, the electronic apparatus 120 may resume to a running state 525 before running the application 310. Thereafter, the electronic apparatus 120 may perform various interactive mechanisms, such as opening/closing the file and redirecting other state snapshots (represented by an arrow 530), with the cloud server 110, and related description regarding the same is not repeated hereinafter.

In other embodiments, assuming that the electronic apparatus 120 is previously suspended due to system failure, when the electronic apparatus 120 loads the application 310 into the sandbox through the application launcher again (corresponding to an arrow 515), the electronic apparatus 120 may also execute aforesaid mechanisms in order to recover back to the running state before running the application 310.

In the present embodiment, if the cloud server 110 determines that a user of an electronic apparatus 540 is identical to the user of the electronic apparatus 120 through the identity authentication procedure, the electronic apparatus 540 may also perform various aforementioned interactions with the cloud server 110 through an application launcher 542, so as to achieve the effectiveness of migrating the running state of the application 310 to the electronic apparatus 540.

In summary, the cloud data management method proposed by the embodiments of the invention is capable of allowing the electronic apparatus to load the application installed on the cloud server into the sandbox in the electronic apparatus through the application launcher in order to prevent the application (e.g., the business applications implementing the company policy) and the data thereof from being mixed with the private application and the data thereof, such that the user experience may be improved and the risk of leaking the confidential business data may also be reduced.

Further, because the cloud server is capable of implementing a specific management policy for the application and the related data thereof, it can be ensured that application and the data thereof accessed by the electronic apparatus as well as the data redirected to the cloud server by the electronic apparatus are both safe and integral. In addition, by adopting the mechanism in which the electronic apparatus redirects the state snapshot to the cloud server, the mechanisms for resuming the application, recovering the application and migrating the application to another electronic apparatus may all be realized easily.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A cloud data management method, adapted to an electronic apparatus, and comprising:
   executing an application launcher installed on the electronic apparatus to send a connection establishing request to a cloud server installed with an application, wherein the connection establishing request is configured to establish a connection with the cloud server, wherein the application is associated with at least one corresponding file or registry;
   receiving a finishing command from the cloud server through the connection, wherein the finishing command indicates that at least one management policy is implemented for the application by the cloud server, the at least one management policy comprises a virus scan operation, a data integrity check operation and an audit operation provided by the cloud server for the application responsive to the connection establishing request;
   loading the application into a sandbox in a memory of the electronic apparatus through the application launcher in response to the finishing command, wherein the application is not installed on the electronic apparatus, and wherein while the application is loaded in the sandbox, the electronic apparatus manages running state data of the application;
   requesting the cloud server to open the at least one file or registry stored in the cloud server while the application runs in the sandbox such that the cloud server implements the at least one management policy for the at least one file or registry; and
   receiving another finishing command from the cloud server through the connection, wherein the another finishing command indicates that the at least one management policy for the corresponding file or the corresponding registry is implemented by the cloud server responsive to the request to open the at least one file or registry,
   wherein the application launcher is configured to transmit a current state of the at least one file or registry and the running state data of the application to the cloud server responsive to each of the current state of the at least one file or registry and the running state data of the application being closed by the application launcher to update the cloud server.

2. The cloud data management method according to claim 1, wherein the application is a responsive application, which adaptively adjusts a graphical user interface layout presented by the electronic apparatus in response to a screen size, a resolution and an operating system of the electronic apparatus.

3. The cloud data management method according to claim 1, wherein when the finishing command from the cloud server is received by the electronic apparatus through the connection, the method further comprises: loading the running state data related to the application into the sandbox in the electronic apparatus through the application launcher.

4. The cloud data management method according to claim 3, wherein the running state data comprises at least one of a data file, a registry, cache data, a configuration file and a profile.

5. The cloud data management method according to claim 1, further comprising:
when the application is running in the sandbox, capturing a state snapshot of at least one current running state data related to the application, and redirecting the state snapshot to the cloud server.

6. The cloud data management method according to claim 5, wherein when the application is initially running in the sandbox, the state snapshot is a full copy of the at least one current running state data,
wherein when the application is not initially running in the sandbox, the state snapshot records a state difference between the at least one current running state data and a previous state snapshot.

7. The cloud data management method according to claim 5, further comprising:
when the electronic apparatus loads the application into the sandbox through the application launcher again, obtaining the state snapshot from the cloud server.

8. The cloud data management method according to claim 5, further comprising:
suspending the application; and
capturing and sending a last state snapshot to the cloud server, and removing all data related to the application from the electronic apparatus.

9. An electronic apparatus, comprising:
a communication circuit;
a memory, storing a plurality of modules;
a random access memory; and
a processing unit, coupled to the communication circuit, the memory and the random access memory, and configured to access the modules in order to execute a cloud data management method, which comprises:
executing an application launcher installed on the electronic apparatus to send a connection establishing request to a cloud server installed with an application through the communication circuit, wherein the connection establishing request is configured to establish a connection with the cloud server, wherein the application is associated with at least one corresponding file or registry;
receiving a finishing command from the cloud server through the connection, wherein the finishing command indicates that at least one management policy is implemented for the application by the cloud server, the at least one management policy comprises a virus scan operation, a data integrity check operation and an audit operation provided by the cloud server for the application responsive to the connection establishing request;
loading the application into a sandbox in a memory of the random access memory through the application launcher in response to the finishing command, wherein the applicant is not installed on the electronic apparatus, and wherein while the application is loaded in the sandbox, the electronic apparatus manages running state data of the application;
requesting the cloud server to open the at least one file or registry a stored in the cloud server while the application runs in the sandbox such that the cloud server implements the at least one management policy for the at least one file or registry; and
receiving another finishing command from the cloud server through the connection, wherein the another finishing command indicates that the at least one management policy for the corresponding file or the corresponding registry is implemented by the cloud server responsive to the request to open the at least one file or registry,
wherein the application launcher is configured to transmit a current state of the at least one file or registry and the running state data of the application to the cloud server responsive to each of the current state of the at least one file or registry and the running state data of the application being closed by the application launcher to update the cloud server.

10. The electronic apparatus according to claim 9, wherein the application is a responsive application, which adaptively adjusts a graphical user interface layout presented by the electronic apparatus in response to a screen size, a resolution and an operating system of the electronic apparatus.

11. The electronic apparatus according to claim 9, wherein when the finishing command from the cloud server is received by the electronic apparatus through the connection, the processing unit further loads the running state data related to the application into the sandbox in the random access memory through the application launcher.

12. The electronic apparatus according to claim 11, wherein the running state data comprises at least one of a data file, a registry, cache data, a configuration file and a profile.

13. The electronic apparatus according to claim 9, wherein when the application is running in the sandbox, the processing unit further captures a state snapshot of at least one current running state data related to the application, and redirects the state snapshot to the cloud server through the communication circuit.

14. The electronic apparatus according to claim 13, wherein when the application is initially running in the sandbox, the state snapshot is a full copy of the at least one current running state data,
wherein when the application is not initially running in the sandbox, the state snapshot records a state difference between the at least one current running state data and a previous state snapshot.

15. The electronic apparatus according to claim 13, wherein when the electronic apparatus loads the application into the sandbox through the application launcher again, the processing unit further obtains the state snapshot from the cloud server through the communication circuit.

16. The electronic apparatus according to claim 9, wherein when the application is suspended, the processing unit further captures and sends a last state snapshot to the cloud server, and removes all data related to the application from the random access memory.

17. A cloud data management method, adapted to a cloud server installed with an application, and comprising:

receiving a connection establishing request sent by an application launcher installed on an electronic apparatus, and establishing a connection with the electronic apparatus according to the connection establishing request, wherein the application is associated with at least one corresponding file or registry;

implementing at least one management policy for the application, and sending a finishing command to the electronic apparatus after implementing the at least one management policy, wherein the finishing command is configured to allow the electronic apparatus to load the application into a sandbox in a memory of the electronic apparatus through the application launcher, the application is not installed on the electronic apparatus, wherein while the application is loaded in the sandbox, the electronic apparatus manages running state data of the application and the at least one management policy comprises a virus scan operation, a data integrity check operation and an audit operation provided by the cloud server for the application responsive to the connection establishing request;

implementing the at least one management policy for the at least one file or registry and then opening the corresponding file or the corresponding registry in response to the electronic apparatus requesting the cloud server to open the at least one file or registry stored in the cloud server and related to the application while the application running in the sandbox in the electronic apparatus;

sending another finishing command to the electronic apparatus through the connection, wherein the another finishing command indicates that the at least one management policy for the corresponding file or the corresponding registry is implemented by the cloud server responsive to the request to open the at least one file or registry; and receiving a current state of the at least one file or registry and the running state data of the application from the electronic apparatus responsive to each of the current state of the at least one file or registry and the running state data of the application being closed by the application launcher to update the cloud server.

18. The cloud data management method according to claim 17, further comprising:

closing the file or the registry and then implementing the at least one management policy for the file or the registry in response to the electronic apparatus requests to close the file or the registry related to the application.

19. A cloud server, comprising:
a communication circuit;
a memory, storing a plurality of modules; and
a processing unit, coupled to the communication circuit and the memory, and configured to access the modules to execute a cloud data management method, which comprises:

receiving a connection establishing request sent by an application launcher installed on an electronic apparatus through the communication circuit, and establishing a connection with the electronic apparatus according to the connection establishing request, wherein the application is associated with at least one corresponding file or registry; and implementing at least one management policy for the application, and sending a finishing command to the electronic apparatus through the communication circuit after implementing the at least one management policy, wherein the finishing command is configured to allow the electronic apparatus to load the application into a sandbox in a memory of the electronic apparatus through the application launcher, the application is not installed on the electronic apparatus, wherein while the application is loaded in the sandbox, the electronic apparatus manages running state data of the application and the at least one management policy comprises a virus scan operation, a data integrity check operation and an audit operation provided by the cloud server for the application responsive to the connection establishing request;

implementing the at least one management policy for the at least one file or registry and then opening the corresponding file or the corresponding registry in response to the electronic apparatus requesting the cloud server to open the at least one file or registry stored in the cloud server and related to the application while the application running in the sandbox in the electronic apparatus;

sending another finishing command to the electronic apparatus through the connection, wherein the another finishing command indicates that the at least one management policy for the corresponding file or the corresponding registry is implemented by the cloud server responsive to the request to open the at least one file or registry; and receiving a current state of the at least one file or registry and the running state data of the application from the electronic apparatus responsive to each of the current state of the at least one file or registry and the running state data of the application being closed by the application launcher to update the cloud server.

* * * * *